United States Patent [19]

Corbeij et al.

[11] 4,060,836

[45] Nov. 29, 1977

[54] TELEVISION DEFLECTION COIL UNIT

[75] Inventors: Peter H. J. Corbeij; Tjitte Talsma, both of Eindhoven, Netherlands

[73] Assignee: U.S. Philips Corporation, New York, N.Y.

[21] Appl. No.: 703,220

[22] Filed: July 7, 1976

[30] Foreign Application Priority Data

July 18, 1975 Netherlands ........................ 7508613

[51] Int. Cl.$^2$ ........................ H04N 3/16; H01F 27/06

[52] U.S. Cl. ...................................... 358/248; 335/212

[58] Field of Search ......................... 358/248, 249, 64; 335/210, 212

[56] References Cited

U.S. PATENT DOCUMENTS

| | | | |
|---|---|---|---|
| 2,568,631 | 9/1951 | Hoellerich | 358/248 |
| 3,189,775 | 6/1965 | Fyler | 358/248 |
| 3,602,853 | 8/1971 | Cummings | 358/248 |
| 3,633,137 | 1/1972 | Thurnell | 358/248 |
| 3,657,674 | 4/1972 | Goldammer | 358/248 |
| 3,921,110 | 11/1975 | Ishii | 358/248 |

*Primary Examiner*—Howard W. Britton

*Attorney, Agent, or Firm*—Frank R. Trifari; Henry I. Steckler

[57] ABSTRACT

A deflection coil unit for color television display tubes in which the narrow end of a flared deflection yoke is mounted in a ball joint, adjusting means being provided at the widest end of the yoke for tilting the deflection yoke about a horizontal and a vertical axis through the ball joint. Thus, the convergence on the vertical and horizontal axis of the display screen can be adjusted. For the adjustment of the color purity, the ball joint is mounted such that it is axially displaceable in a housing.

3 Claims, 3 Drawing Figures

TELEVISION DEFLECTION COIL UNIT

The invention relates to a deflection coil unit for a television display tube, said unit comprising a flared deflection yoke which is located within a housing, which housing is secured to a display tube when the unit is mounted thereon, said yoke being capable of being displaced along its longitudinal axis which is adapted to substantially coincide with the longitudinal axis of a display tube and being tilted about a transverse axis which extends perpendicularly to the longitudinal axis of said yoke and which is situated adjacent the narrow end of said yoke.

A deflection coil unit of the above kind is known from U.S. Pat. No. 3,602,853 where the deflection yoke can only be tilted about one (horizontal) transverse axis.

It has been found in practice that, especially with colour television display tubes having three electron guns arranged in one plane — where suitable dynamic convergence can be achieved by a suitable choice of the geometry of the deflection fields without additional aids being required — residual errors can occur in the dynamic convergence. These residual errors are caused due to the tolerances allowed during the manufacture of the display tube and the deflection coil unit, whereby the axes of the deflection fields and the display tube do not exactly coincide after the deflection coil unit has been mounted on the display tube. This coincidence, however, is a condition for achieving the dynamic convergence without additional aids. It has been found that these errors can be corrected by tilting the deflection yoke about a horizontal as well as a vertical transverse axis until the axes of the display tube and the deflection yoke substantially coincide or are at least parallel. The adjustment of colour purity is also important and which is achieved by moving the deflection yoke along its longitudinal axis.

The invention provides a deflection coil unit for a television display tube, said unit comprising a flared deflection yoke which is located within a housing, which housing is secured to a display tube when the unit is mounted thereon, said yoke being capable of being displaced along its longitudinal axis which is adapted to substantially coincide with the longitudinal axis of a display tube, said yoke at its narrow end being mounted in a ball joint which comprises first and second members each having a part spherical surface which cooperate to allow pivotal movement about a plurality of axes, said first member being secured to said yoke whilst said second member is capable of being secured to said housing, and adjusting means for tilting said yoke about two mutually perpendicular transverse axes which extend perpendicular to the longitudinal axis of said yoke and which are situated at or adjacent the said narrow end of said yoke.

Figure 1:
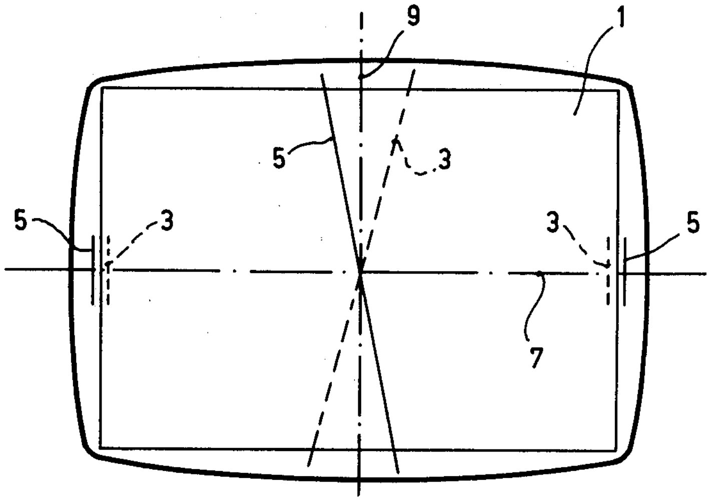
Figure 2:
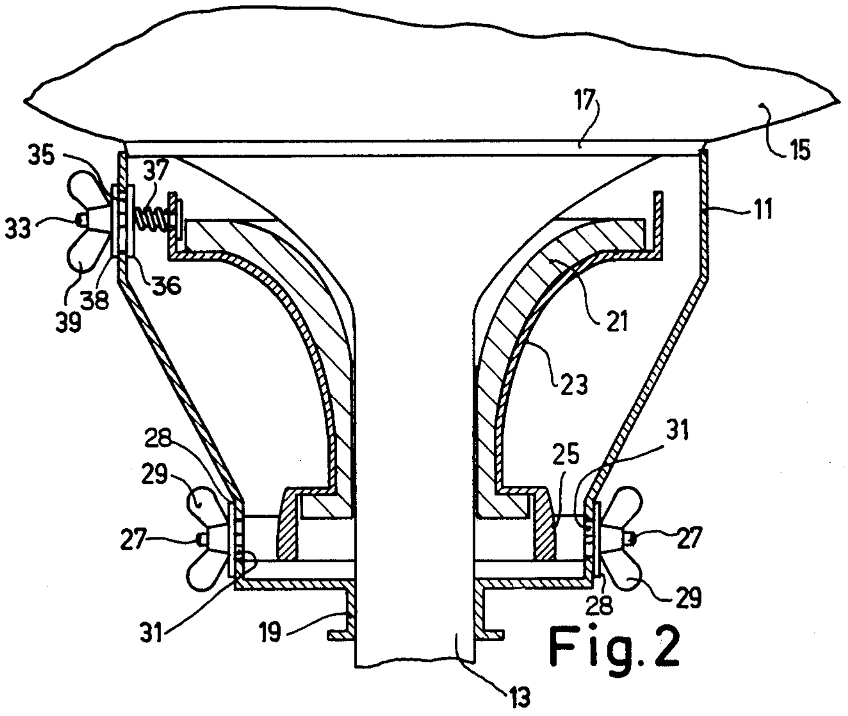
Figure 3:
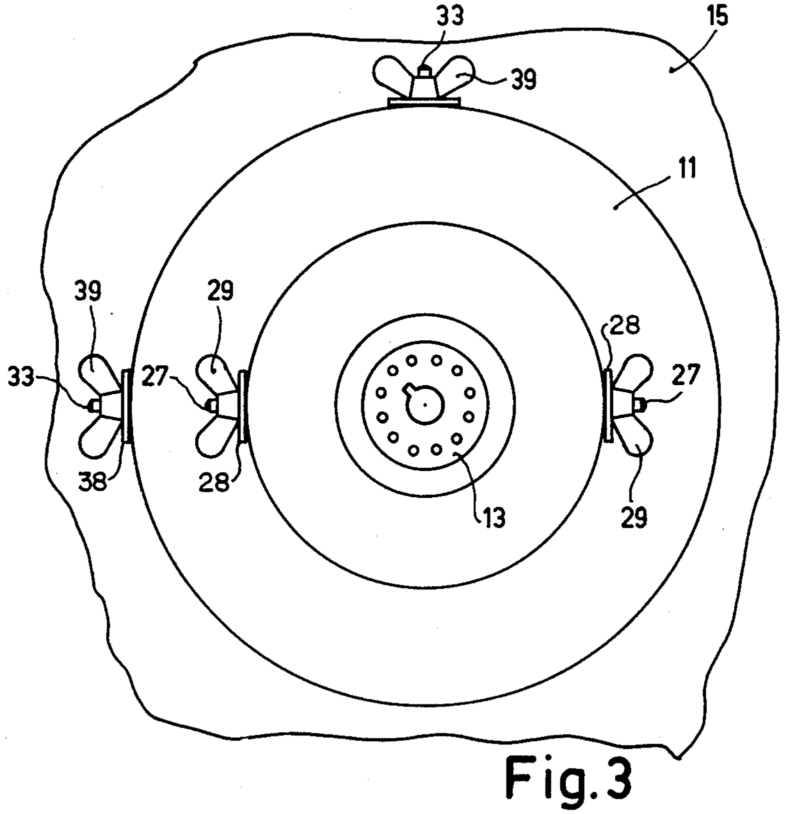

The above and other features of the invention will be described in greater detail by way of example with reference to the accompanying drawings, in which FIG. 1 shows a display screen of a colour display tube to illustrate the residual errors in convergence, FIG. 2 is a longitudinal sectional view of a portion of a display tube with a deflection coil unit according to the invention, and FIG. 3 is a rear view of the deflection coil unit of FIG. 2.

FIG. 1 shows a display screen 1 of a shadowmask tube accommodating three adjacently arranged in-line electron guns, the central electron gun emitting an electron beam which is incident on green phosphor elements on the display screen, whilst the electron beams of the two outer guns are incident on red and blue phosphor elements, respectively. On the display screen 1 three vertical pairs of lines are shown, each pair being indicated by a broken line 3 representing a displayed red line and a full line 5 representing a displayed blue line which lines should coincide. Because the longitudinal axis of the display tube does not exactly coincide with that of the deflection coil unit (not visible in FIG. 1), the blue and the red lines do not coincide either. Convergence errors occur near the ends of the horizontal axis 7 of the display screen as well as near the ends of the vertical axis 9. It has been found that the errors on the horizontal axis 7 of the display screen can be corrected by tilting the deflection yoke in the horizontal direction (i.e. about a vertical axis), whilst the errors on the vertical axis of the display screen can be corrected by tilting the deflection yoke in the vertical direction. Furthermore, displacement of the deflection yoke in the axial direction is desirable for colour purity adjustment.

FIGS. 2 and 3 show diagrammatically a deflection coil unit in which the deflection yoke is capable of performing the above three movements. The deflection coil unit comprises a housing 11 which is mounted on the display tube at the area where a cylindrical neck portion 13 of the display tube changes into a flared portion 15 which accommodates the display screen 1 on its widest (front) end (not shown in FIGS. 2 and 3). The front of the housing 11 (the upper side in FIG. 2) is centred on the flared portion of the display tube by means of a raised portion 17 of the glass of the display tube, whilst the rear of the housing is clamped in known manner about the neck 13 by way of spring tongues 19.

The housing 11 accommodates a flared deflection yoke, comprising an electromagnetic portion 21 which is secured in a holder 23 of synthetic material. The electromagnetic portion 21, not being shown in detail, consists of a known assembly of a ferromagnetic ring core and toroidally wound or saddle-shaped horizontal and vertical deflection coils. The holder 23 is mounted at its narrow end in a ball joint which is formed by a first annular member 25 which is an extension of the holder 23 and which has an outer part spherical surface, and a second annular member 26 having an inner part spherical surface which cooperates with that on member 25. The two members 25 and 26 are snapped together by pressure on assembly such that they will not come apart thereafter but member 25 is able to move within member 26 as is normal with ball joint assemblies. The annular member 26 is secured to the housing 11 by means of two radially projecting screws 27 mounted in member 26 which cooperate washers 28 and wing nuts 29. The screws 27 project through elongate slots 31 in the housing 11, the major dimension of these slots being parallel to the longitudinal axis of the housing which substantially coincides with the longitudinal axis of the display tube.

Near the wide of the deflection yoke 21, 23 are provided two mutually perpendicular adjusting screws 33, one of which is located in a horizontal position when mounted on the display tube in the operating condition, whilst the other screw is located in a vertical position. The adjusting screws 33 are retained in the holder 23 and project radially through oversize holes 35 in the housing 11, the diameter of these holes corresponding approximately to the major dimension of the slots 31. A helical spring 37 which acts as a compression spring is arranged about each adjusting screw 33 and between the holder 23 and a washer 36 which bears against the inner surface of the housing 11. The holder 23 can be moved towards the housing 11, against the force of the spring 37, by tightening a wing nut 39 on one of the adjusting screws 33 a further washer 38 being provided between the outer surface of the housing 11 and the wing nut 39. The deflection yoke 21, 23 can then be tilted about an axis which is situated at the area of the ball joint 25 and which is transverse to the longitudinal axis. If the wing nut 39 of the horizontal adjusting screw 33 is turned, the transverse axis will be vertical whilst if the wing nut of the vertical adjusting screw is turned, the transverse axis will be horizontal. If both wing nuts 39 are turned then the direction of movement will be between these two axes and will be the resultant of components in each transverse axis.

The procedure for adjusting convergence and colour purity is as follows. First of all, without current flowing through either of the deflection coils, the colour purity and the convergence of the non-deflected electron beams, i.e. at the area of the intersection of the two axes 7 and 9, is adjusted by means of a static convergence unit (not shown). The deflection coils are then energised from their deflection circuits and an image (for example, a crosshatch pattern of vertical and horizontal lines) is aligned by rotation of the housing 11 about its longitudinal axis. The wing nuts 29 are then loosened to allow the entire deflection yoke 21, 23 is shifted in the axial direction along the neck 13 of the display tube for suitable adjustment of the colour purity across the entire display screen 1, the screws 27 and 33 then being displaced in their associated slots 31 and 35, respectively. The force exerted by the springs 37, obviously, must not be so large that this movement is seriously impeded.

When the colour purity has been properly adjusted, the axial position of the deflection yoke 21, 23 is fixed on the neck 13 by tightening the wing nuts 29 which act to lock the annular member 26 to the housing 11. This has no effect on the operation of the ball joint formed by the members 25 and 26 which are free to move one within the other, and the convergence on the horizontal axis 7 and the vertical axis 9 can then be adjusted by turning the wing nut 39 for either or both of the horizontal and vertical adjusting screws 33, respectively.

Obviously, this construction requires only very few components and the operation is extremely simple.

Of course, there are alternative arrangements which may be used in the above described embodiment. For example, instead of the adjusting screws 33, other adjusting means, for example, a worm plus associated pinion wheel, can be used. The method of fixing the deflection yoke 21, 23 in the axial direction can alternatively be effected in a manner other than by means of the lock nuts 29, for example, by means of a band or members which cause frictional engagement between the annular member 26 and housing 11.

What is claimed is:

1. A deflection coil unit for a television display tube, said unit comprising a housing, a flared deflection yoke which is located within said housing, which housing is adapted to be secured to a display tube when the unit is mounted thereon, said yoke being capable of being displaced along its longitudinal axis which is adapted to substantially coincide with the longitudinal axis of a display tube, a ball joint means for mounting said yoke at its narrow end comprising first and second members each having a part spherical surface which cooperate to allow pivotal movement of said yoke about a plurality of axes, said first member being secured to said yoke, said second member being capable of being secured to said housing, and separate adjusting means for independently tilting said yoke about two mutually perpendicular transverse axes which extend perpendicular to the longitudinal axis of said yoke and which are situated at or adjacent the said narrow end of said yoke.

2. A deflection coil unit as claimed in claim 1, wherein said adjusting means comprise two radially projecting mutually perpendicular screws located at the widest end of said yoke, each of which passes through a corresponding hole in said housing.

3. A deflection coil unit as claimed in claim 1, wherein said second member comprises two radially projecting screws which project through slots in said housing, the major dimension of each slot being parallel to the longitudinal axis of said housing to allow for said longitudinal displacement of said yoke, each screw having a lock nut means for screwing said second annular member to said housing, thereby fixing the longitudinal axial position of said yoke.

* * * * *